（12）United States Patent
Schmitz et al.

(10) Patent No.: US 10,632,871 B2
(45) Date of Patent: Apr. 28, 2020

(54) CHILD SAFETY SEAT WITH HEADREST HEIGHT ADJUSTMENT MECHANISM

(71) Applicant: BRITAX RÖMER KINDERSICHERHEIT GMBH, Leipheim (DE)

(72) Inventors: Michael Schmitz, Ulm (DE); Richard Henseler, Ulm (DE)

(73) Assignee: BRITAX RÖMER KINDERSICHERHEIT GMBH, Leipheim (DE)

( * ) Notice: Subject to any disclaimer, the term of this patent is extended or adjusted under 35 U.S.C. 154(b) by 0 days.

(21) Appl. No.: 16/121,980

(22) Filed: Sep. 5, 2018

(65) Prior Publication Data
US 2019/0070984 A1 Mar. 7, 2019

(30) Foreign Application Priority Data
Sep. 6, 2017 (EP) .................................... 17001495

(51) Int. Cl.
*B60N 2/26* (2006.01)
*B60N 2/28* (2006.01)
*B60N 2/818* (2018.01)
(52) U.S. Cl.
CPC ........... *B60N 2/2851* (2013.01); *B60N 2/818* (2018.02); *B60N 2/2812* (2013.01); *B60N 2/2866* (2013.01); *B60N 2002/2818* (2013.01)
(58) Field of Classification Search
CPC ............................... B60N 2/2851; B60N 2/818
USPC ...................................................... 297/250.1
See application file for complete search history.

(56) References Cited

U.S. PATENT DOCUMENTS

| 6,030,047 | A | 2/2000 | Kain | |
|---|---|---|---|---|
| 6,491,348 | B1 * | 12/2002 | Kain | B60N 2/2812 297/250.1 |
| 6,623,074 | B2 * | 9/2003 | Asbach | B60N 2/2812 297/250.1 |

(Continued)

FOREIGN PATENT DOCUMENTS

| EP | 2474440 A2 | 7/2012 |
|---|---|---|
| WO | 2015025434 A1 | 2/2015 |

OTHER PUBLICATIONS

Extended Search Report and Written Opinion of corresponding European application No. 17001495.5 dated May 23, 2018, all enlcosed pages cited.

Primary Examiner — Rodney B White
(74) Attorney, Agent, or Firm — Burr & Forman LLP

(57) ABSTRACT

A child safety seat includes a seat shell, a headrest, a guiding component, slidably coupled to the seat shell, for guiding a strap of an integral harness system, and an adjustment mechanism for adjusting the height of the headrest. The adjustment mechanism includes a coupling element which is configured to be placed in a first and a second configuration, and, when placed in the first configuration, the coupling element couples the headrest with the guiding component such as to allow for movement of the headrest together with the guiding component relative to the seat shell. When placed in the second configuration, the coupling element couples the seat shell with the guiding component to prevent the guiding component from movement relative to the seat shell and to allow for movement of the headrest relative to the seat shell.

19 Claims, 10 Drawing Sheets

(56) References Cited

U.S. PATENT DOCUMENTS

| | | | |
|---|---|---|---|
| 6,626,493 B2 * | 9/2003 | Kain | B60N 2/2812 297/250.1 |
| 6,779,843 B2 * | 8/2004 | Kain | B60N 2/2812 297/250.1 |
| 6,820,939 B1 * | 11/2004 | Chen | B60N 2/2812 297/250.1 |
| 7,021,710 B2 * | 4/2006 | Kain | B60N 2/2851 297/250.1 |
| 7,055,903 B2 * | 6/2006 | Balensiefer | B60N 2/2821 297/250.1 X |
| 7,232,185 B2 * | 6/2007 | Hartenstine | B60N 2/2851 297/250.1 |
| 7,246,852 B2 * | 7/2007 | Balensiefer | B60N 2/2851 297/250.1 |
| 7,306,284 B2 * | 12/2007 | Horton | B60N 2/2812 297/250.1 |
| 7,370,912 B2 * | 5/2008 | Williams | B60N 2/2851 297/250.1 X |
| 7,637,568 B2 * | 12/2009 | Meeker | B60N 2/2806 297/250.1 X |
| 7,735,919 B2 * | 6/2010 | Chen | B60N 2/2812 297/250.1 |
| 7,862,117 B2 * | 1/2011 | Hutchinson | B60N 2/2806 297/250.1 |
| 7,901,003 B2 * | 3/2011 | Meeker | B60N 2/2806 297/250.1 |
| 7,954,895 B2 * | 6/2011 | Freeman | B60N 2/2851 297/250.1 |
| 8,226,162 B2 * | 7/2012 | Campbell | B60N 2/2812 297/250.1 X |
| 8,272,690 B2 * | 9/2012 | Brandl | B60N 2/2851 297/250.1 |
| 8,282,165 B2 * | 10/2012 | Kespohl | B60N 2/2845 297/250.1 X |
| 8,342,604 B2 * | 1/2013 | Heisey | B60N 2/2812 297/250.1 |
| 8,622,476 B2 * | 1/2014 | Karremans | B60N 2/2851 297/250.1 |
| 8,622,478 B2 * | 1/2014 | Spence | B60N 2/2812 297/250.1 X |
| 8,764,108 B2 * | 7/2014 | Gaudreau, Jr. | B60N 2/2812 297/250.1 |
| 9,067,516 B2 * | 6/2015 | Hutchinson | B60N 2/2812 |
| 9,162,593 B2 * | 10/2015 | Spence | B60N 2/265 |
| 9,346,377 B2 * | 5/2016 | Xu | B60N 2/2851 |
| 9,381,834 B2 * | 7/2016 | Hutchinson | B60N 2/265 |
| 9,415,707 B2 * | 8/2016 | Bohm | B60N 2/2851 |
| 9,573,496 B2 * | 2/2017 | Spence | B60N 2/265 |
| 9,771,006 B2 * | 9/2017 | Forbes | B60N 2/265 |
| 9,789,791 B2 * | 10/2017 | Hutchinson | B60N 2/2821 |
| 2004/0124677 A1 * | 7/2004 | Meeker | B60N 2/2806 297/255 |
| 2007/0057547 A1 * | 3/2007 | Hartenstine | B60N 2/2806 297/256.13 |
| 2007/0063556 A1 * | 3/2007 | Santamaria | B60N 2/2812 297/250.1 |
| 2007/0236061 A1 * | 10/2007 | Meeker | B60N 2/20 297/250.1 |
| 2007/0246982 A1 * | 10/2007 | Nett | B60N 2/2851 297/250.1 |
| 2010/0264706 A1 * | 10/2010 | Vogt | B60N 2/2812 297/250.1 |
| 2011/0309663 A1 * | 12/2011 | Brunick | B60N 2/2812 297/250.1 |
| 2013/0154321 A1 * | 6/2013 | Leese | B60N 2/2851 297/250.1 |
| 2013/0175835 A1 * | 7/2013 | Fujita | B60N 2/265 297/250.1 X |
| 2013/0320725 A1 * | 12/2013 | Conway | B60N 2/2851 297/256.11 |
| 2014/0021758 A1 * | 1/2014 | Chen | B60N 2/26 297/256.11 |
| 2014/0049081 A1 * | 2/2014 | Davis | B60N 2/26 297/256.11 |
| 2014/0062150 A1 * | 3/2014 | Strong | B60N 2/2824 297/250.1 |
| 2014/0232152 A1 * | 8/2014 | Minato | B60N 2/2809 297/216.11 |
| 2015/0115676 A1 * | 4/2015 | Strong | B60N 2/2806 297/250.1 |
| 2016/0039319 A1 * | 2/2016 | Zhang | B60N 2/2851 297/216.11 |
| 2016/0114705 A1 * | 4/2016 | Morgenstern | B60N 2/2851 297/250.1 X |
| 2016/0144749 A1 * | 5/2016 | Mo | B60N 2/22 297/256.11 |
| 2016/0362025 A1 * | 12/2016 | Heisey | B60N 2/2851 |
| 2016/0368400 A1 * | 12/2016 | Taylor | B60N 2/2875 |
| 2017/0008429 A1 * | 1/2017 | Johnson | B60N 2/2872 |
| 2017/0113576 A1 * | 4/2017 | Jane Santamaria | B60N 2/2812 |
| 2017/0190268 A1 * | 7/2017 | Zhao | B60N 2/2851 |
| 2017/0282758 A1 * | 10/2017 | Mitchell | B60N 2/2812 |
| 2017/0349065 A1 * | 12/2017 | Pleiman | B60N 2/809 |
| 2018/0126877 A1 * | 5/2018 | Williams | B60N 2/2851 |
| 2018/0134187 A1 * | 5/2018 | Mason | B60N 2/2812 |
| 2019/0061570 A1 * | 2/2019 | Mason | B60N 2/2812 |

\* cited by examiner

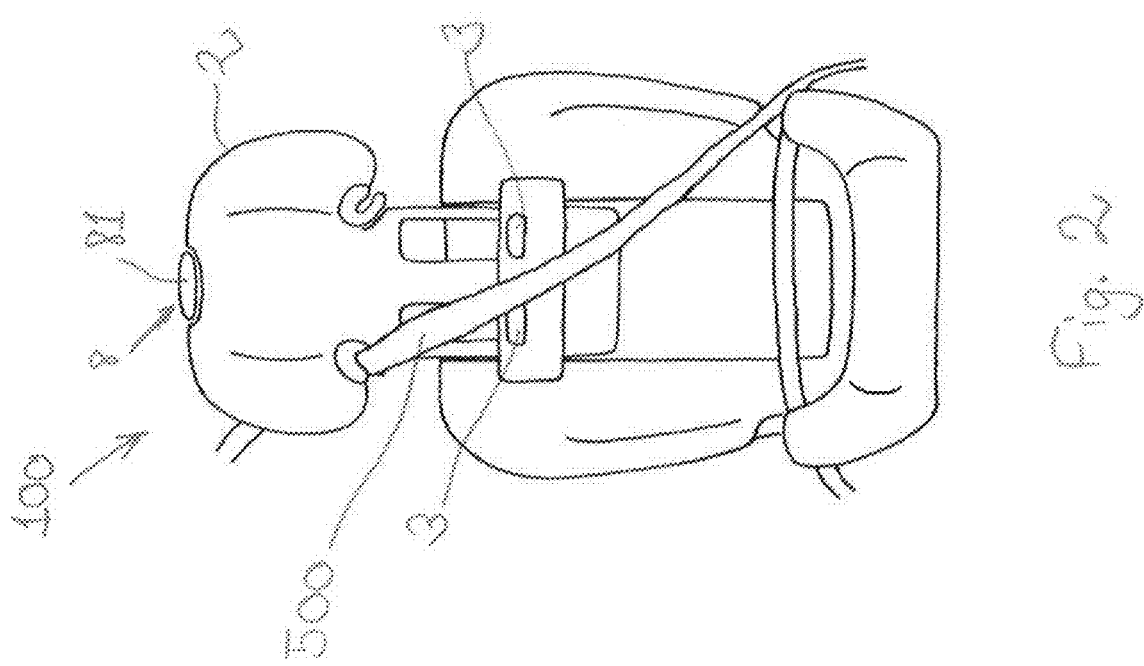

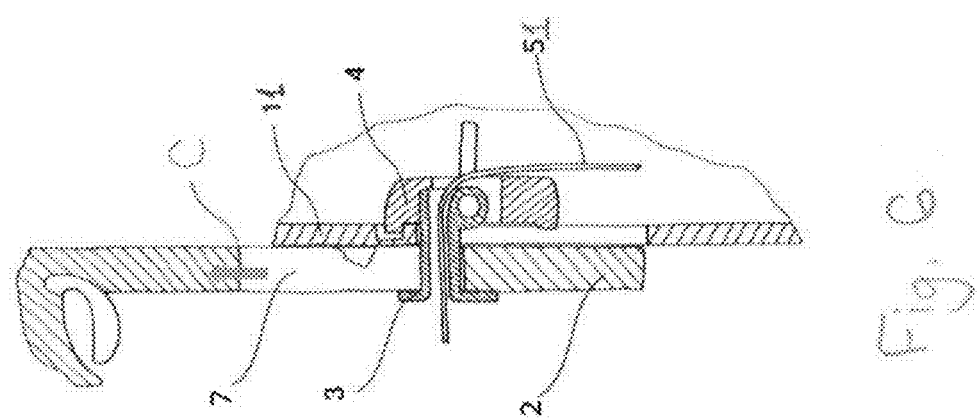

CHILD SAFETY SEAT WITH HEADREST HEIGHT ADJUSTMENT MECHANISM

This application claims priority to European application number 17001495.5 filed Sep. 6, 2017, the entire contents of which are hereby incorporated by reference in its entirety.

The invention relates to a child safety seat with an adjustment mechanism for adjusting the height of the child safety seat's headrest. In particular, the invention relates to a combination child safety seat with an anti-misuse mechanism which prevents a user from using the child safety seat in integral mode too long and from using the child safety seat in non-integral mode too early.

Smaller children, such as babies or toddlers, are held firmly in their safety seat mounted on a passenger seat of a vehicle with a special restraint device, such as an integral harness system. For this age group, a safety seat with a 3-point or 5-point harness using a harness buckle as a coupling device is the safest way to travel. The 3-point or 5-point harness of the safety seat firmly secures shoulders and hips of the child in the seat. In order to properly secure the child with the 3-point or 5-point harness, it is important that the shoulder straps of the harness are properly guided over the child's shoulders so that in the case of a front collision the body of the child is efficiently restrained and decelerated. In addition, in order to protect the child's head, the headrest of the child seat needs to be correctly adjusted so that the forces from the impact are deviated from the head.

In order to facilitate the adjustment of the shoulder straps and the headrest in accordance with the child's size and age, some of the known child safety seats comprise an adjustment mechanism that couples the harness and the headrest. Because of this, the adjustment of the headrest causes the correct adjustment of the harness and vice versa.

Older children can use the 3-point adult seat belt with a highback booster seat, as this correctly positions the 3-point adult seat belt over the child's body. Also such child seats comprise a height adjustable headrest.

From the above, child safety seats can either be used with an integral harness system or in connection with the safety belts of a vehicle for restraining a child in the child safety seat. Child safety seats which use means directly connected to the vehicle, such as adult seat belts, for restraining the child, fall into the so-called non-integral class.

There exist also so-called combination child seats, or so-called group 123 child seats. Combination child seats allow to combine different safety systems for smaller children and for older children in one seat. When used for a smaller child, the integral harness system of the combination child seat is used to secure the child. This is the so-called integral mode. The integral harness may be either a 3-point or a 5-point harness. The 3-point harness comprises two shoulder straps. At one end portion of each shoulder strap there is connected a tongue adapted to engage with a harness buckle. The other ends of each shoulder strap are coupled to the combination child seat. The 5-point harness comprises also two straps. One end of each strap is connected to the seat base of the combination child seat. A buckle tongue is slideably connected to each strap. The buckle tongues are inserted into the harness buckle for securing the child. The portion of the strap running from the seat base to the tongue is guided over the hips/thighs of the child. The portion of the straps running from the tongue to the backrest of the combination child seat is guided over the shoulders of the child. When the child gets older, it is secured in the combination child seat by the safety belt of the vehicle. Then, the integral harness system can be stowed away. This is the so-called non-integral mode. The combination child seat can be used over a larger range of child's ages.

Integral mode starts at an age of about 1 year and ends at about 4 years or more. Non-integral mode starts at an age of about 3 years and ends with 12 years. Thus, there is an overlap range between approximately 3 and 4 years in which the child safety seat can be used either in integral mode or in non-integral mode. Because of this, there exist several potential sources of misuse. This is, the child safety seat might be used too long in integral mode. Likewise, the change from integral mode to non-integral mode might have been performed too early. Performing the change from integral mode to non-integral mode outside the above mentioned overlap range from approximately 3 to 4 years drastically increases the risk of severe injuries of a child in a vehicle accident, if the child safety seat is not used in the appropriate mode.

In addition, the transmission of known combination child seats from the integral mode to the non-integral mode is generally very cumbersome. As mentioned above, when the combination child seat is used with the integral harness system, i.e., in integral mode, the latter is commonly coupled to the headrest. In integral mode, known combination seats comprise an adjuster at the back of the seat for adjusting the headrest and the harness. For the transmission to the non-integral mode, many of the known combination child safety seats require the harness to be removed. Only if this is done, the headrest can be lifted further. The further raising of the headrest has to be done, however, by means of a second adjuster. Because of this, known child safety seats use two separate adjusters for adjusting the height of the headrest, depending on the integral or non-integral mode in which the seat is used. This not only makes the transmission cumbersome, but also implies a risk especially in cases where users need to refit the integral harness system, again.

It is, thus, an object of the present invention to provide a child safety seat with enhanced ease of use that allows for easier and faster transmission between integral mode and non-integral mode, and with an anti-misuse mechanism which prevents the usage of the non-integral mode too long and/or which prevents the usage of the non-integral mode too early.

This object is achieved by the child safety seat according to claim 1 and by the child safety seat according to claim 10. Further advantageous embodiments of the present invention are indicated in claims 2 to 9, and in claims 11 to 15.

According to a first aspect of the invention there is provided a child safety seat comprising a seat shell, a headrest, a guiding component, which is slidably coupled to the seat shell, for guiding a strap of an integral harness system of the child safety seat, and an adjustment mechanism for adjusting the height of the headrest comprising a coupling element. The coupling element is configured to be placed in a first configuration and a second configuration. When placed in the first configuration, the coupling element couples the headrest with the guiding component such as to allow for movement of the headrest together with the guiding component relative to the seat shell. When placed in the second configuration, the coupling element couples the seat shell with the guiding component such as to prevent the guiding component from movement relative to the seat shell and such as to allow for movement of the headrest relative to the seat shell.

Owing to the two configurations the coupling element can be placed in, height adjustment of the child safety seat's headrest may be accomplished when used together with the integral harness system or with a safety belt of a vehicle for securing a child in the child safety seat. The child safety seat can be used in integral mode or in non-integral mode. There is no need for removing the integral harness system even when the child safety seat is used in the non-integral mode. The integral mode of the child safety seat is defined by the usage of the integral harness system for securing a child in the child safety seat. The non-integral mode is defined by the usage of the safety belt of a vehicle for securing the child in the child safety seat. The adjustment mechanism of the invention has the advantage that only the coupling element needs to be operated in order to disengage the guiding component for guiding the straps of the integral harness system from the headrest, when the headrest has reached a height corresponding to an age in which the non-integral mode becomes mandatory. Preferably, the first configuration is used during the integral mode. Preferably, the second configuration is used during the non-integral mode. Advantageously, the guiding component is a harness slider configured to guide the shoulder straps of the integral harness system. In the first configuration, due to the coupling of the headrest with the guiding component by the coupling element of the adjustment mechanism, the adjustment of the headrest causes the shoulder straps of the integral harness to be correctly positioned, and vice versa. When the coupling element is placed in the second configuration, the guiding component for guiding the shoulder straps of the integral harness system is decoupled from the headrest. The guiding component is prevented from movement relative to the seat shell, while movement of the headrest relative to the seat shell is possible. That is, when placed in the second configuration, the coupling element couples the seat shell with the guiding component such that the guiding component stays at a fixed position upon movement of the headrest. The fixation of the guiding component, when the coupling element is in the second configuration, allows the integral harness to remain fitted to the child safety seat. Because of the decoupling of the guiding component from the headrest, the movement of the headrest is not related to the guiding component any more. Therefore, the integral harness does not prevent the headrest from being adjusted in non-integral mode. Therefore, the height of the headrest may still be adjusted in the same way as in the first configuration. This has the advantage that only one element needs to be operated for height adjustment independent of the configuration in which the child safety seat is used. A second advantage is that the integral harness may stay on the child safety seat; it does not have to be removed when the child seat is used in the non-integral mode. Since the integral harness needs not to be removed, misuse by the user is prevented, especially when transmission is performed from the non-integral mode back to the integral mode.

Advantageously, the seat shell comprises a seating portion. The seating portion is configured to receive the bottom and part of the legs of the child.

Preferably, the child safety seat is configured such that the headrest is allowed to engage with the seat shell at heights ranging from a lowest position to an intermediate position, being further distant from the seating portion than the lowest position, when the coupling element is in the first configuration. It is further preferred that the child safety seat is configured such that the headrest is allowed to engage with the seat shell at heights ranging from the intermediate position to a highest position, being further distant from the seating portion than the intermediate position, when the coupling element is in the second configuration. The range between the lowest position and the intermediate position defines the adjustment range of the headrest in the first configuration. The lowest position defines the lowest possible position for the headrest. Preferably, this lowest position is chosen such that the headrest fits to children aged 1 year. The intermediate position defines the highest possible position of the headrest when the coupling element is in the first configuration, preferably, in integral mode. In other words, above the intermediate position the guiding component for the straps of the integral harness system is decoupled from the movement of the headrest. It is not possible to further raise the guiding component, e.g., with the outlets of the shoulder straps of the integral harness system, beyond the intermediate position. In addition, the headrest may not be placed at higher positions than the intermediate position as long as the coupling element is placed in the first configuration. This implies that for larger children sitting in the child safety seat it might not be possible to guide the straps of the integral harness system correctly over the shoulders of the child or to adjust the height of the headrest properly. Thus, a user trying to use the integral harness system for older children will recognize that this is hardly possible. Therefore, it is avoided that the child safety seat is used too long in integral mode.

It is advantageous if this intermediate position is chosen such that the headrest fits to children aged 4 years. The distance between the lowest position and the intermediate position is preferably between 9 cm and 13 cm, advantageously between 10.5 cm and 11.1 cm, the most preferred value being 11.1 cm.

The highest position defines the highest possible position of the headrest when the coupling element is in the second configuration, preferably, in non-integral mode. The highest position is preferably the highest possible position the headrest can be placed in. It is advantageous if this highest position is chosen such that the headrest fits to children aged 12 years. The distance between the intermediate position and the highest position is preferably between 12 cm and 16 cm, advantageously between 13.5 cm and 14.5 cm, the most preferred value being 14.2 cm.

The adjustment range may be taken from anthropometric data. In the integral mode, the shoulder height should be variable from 28 cm to 39.1 cm when measured from the seating portion. Since the guiding component is preferably positioned such that the shoulder straps of the integral harness are guided out of the guiding component substantially horizontally over the shoulders of the child, the guiding component is adapted to be moved in the range between 27 cm measured from the seating portion to 40 cm measured from the seating portion, advantageously between 28 cm measured from the seating portion to 39.5 cm measured from the seating portion. The lowest position is preferably positioned between 27 cm and 28 from the seating portion. The intermediate position is preferably positioned between 39 cm to 39.5 cm from the seating portion. In the non-integral mode, the shoulder height should be variable from 39.1 cm to 53.3 cm when measured from the seating portion.

Since the lower edge of the headrest is correctly positioned if it nearly touches the shoulders of the child sitting in the child seat, the headrest is adapted to be moved in the range between 27 cm measured from the seating portion to 55 cm measured from the seating portion, advantageously between 28 cm measured from the seating portion to 53.5 cm measured from the seating portion. The lowest position is preferably positioned between 27 cm and 28 from the seating portion. The highest position is preferably positioned between 53.0 cm to 53.5 cm from the seating portion.

Advantageously, the coupling element is configured such that a change from the first to the second configuration is possible only if the headrest is in the intermediate position. This means that a change from the first to the second configuration is only possible if the headrest is placed at the highest position possible in the first configuration. The advantage is that misuse is prevented and that it is prevented that large children are secured too long with the integral harness system. The user is, thus, forced to secure the child with the safety belt of the vehicle once the headrest needs to be adjusted at a height which is beyond the intermediate position.

Advantageously, in non-integral mode, the shoulder straps of the integral harness may be stowed or hidden behind a backrest cover of the child safety seat. The hiding of the shoulder straps behind the cover increases the comfort for the child sitting in the seat, when the latter is used in non-integral mode, since there is no direct contact of the child's back with the shoulder straps.

Advantageously, the coupling element, when placed in the first configuration, further couples the headrest with the guiding component such that the distance between the headrest and the guiding component remains constant upon their movement. Preferably, the distance is chosen such that the guiding component is positioned at a lower edge of the headrest. By this, the shoulder straps of the harness system are positioned such that they may substantially pass parallel over the shoulders of the child sitting in the child safety seat. This is the correct position of the shoulder straps. Since the distance does not change as long as the coupling element is in the first configuration, adjustment of the headrest causes the integral harness to be automatically adjusted, and vice versa. The adjustment of the integral harness is such that the guiding component and, thus, the shoulder straps guided through it, are at the correct height.

Advantageously, the adjustment mechanism further comprises a locking mechanism adapted to engage the headrest with the seat shell at different heights from the seating portion. The locking mechanism has the advantage to fix the headrest at different heights. This allows to adjust the headrest depending on the different sizes and ages of the child. Preferably, the locking mechanism is adapted to allow for a gradual displacement of the headrest. In an alternative, a continuous displacement of the headrest may, however, also be advantageous.

Advantageously, the locking mechanism of the adjustment mechanism further comprises an actuator operable to move the headrest from the lowest position to the intermediate position, when the coupling element is in the first configuration, and from the intermediate position to the highest position, when the coupling element is in the second configuration. The actuator which is operable to move the headrest both in the first configuration and in the second configuration has the advantage that the height adjustment of the headrest can be performed by one single operational element. The operation of the same actuator is sufficient to adjust the height of the headrest in the first configuration and in the second configuration of the coupling element. It is preferred that the actuator is situated on the top of the headrest. This allows adjustment of the headrest even when the seat is installed in a vehicle or even if the child is placed in the child safety seat.

Preferably, the locking mechanism comprises a toothed rack attached to the seat shell and a locking element, wherein the locking mechanism is configured such that the locking element is received by the toothed rack when the headrest is engaged with the seat shell. The toothed rack may either be integrally formed with the seat shell, or it may also be a separate component. The toothed rack and the locking element provide a simple mechanism allowing for a gradual displacement of the headrest. It is further preferable if the locking mechanism is configured such that the locking element disengages from the toothed rack upon operation of the actuator. This makes sure that the adjustment of the height of the headrest can be performed by operating only the actuator. That is, by operating the actuator the headrest is released from engagement with the toothed rack, allowing the headrest to be moved up or down the seat shell.

Advantageously, the seat shell further comprises a backrest portion, wherein the guiding component is slidable along the backrest portion, when the coupling element is placed in the first configuration. This, preferably, allows for adjustment of the integral harness system when the child safety seat is used in integral mode. Preferably, the backrest portion of the seat shell comprises a backrest opening, wherein the guiding component and the coupling element are slidably mounted in the backrest opening, when the coupling element is placed in the first configuration. The backrest opening advantageously provides for a guiding rail of the guiding component. It is further advantageous, if the backrest opening provides for a guiding rail of the coupling element, too. Preferably, the backrest opening of the seat shell is dimensioned so as to allow the headrest to move from the lowest position to the intermediate position.

Advantageously, the headrest has a headrest opening adapted to receive the guiding component, when the coupling element is in the second configuration, and wherein the headrest opening is dimensioned so as to allow the headrest to move from the intermediate position to the highest position. The headrest opening allows the headrest to be adjusted, once the coupling element is placed in the second configuration, even when the guiding component is fixed in the intermediate position.

Preferably, the coupling element is a transmission switch, a pivoted lever, or a sliding element. These are components which are cheap and easy to produce.

Advantageously, the child safety seat further comprises a compartment adapted to receive a locking member of the integral harness system, and a blocking element, wherein the blocking element is coupled to the headrest such that the blocking element blocks the compartment against reception of the locking member as long as the headrest is placed at heights lower than a lowest non-integral headrest position from the seating portion. The advantageous will be described and will become apparent with regard to the second aspect of the invention below.

According to a second aspect of the invention there is provided a child safety seat comprising a seat shell with a seating portion, a headrest, an integral harness system comprising a locking member, an adjustment mechanism for adjusting the height of the headrest, a compartment adapted to receive the locking member, and a blocking element. The blocking element is coupled to the headrest such that the blocking element blocks the compartment against reception of the locking member as long as the headrest is placed at heights lower than a lowest non-integral headrest position from the seating portion.

The lowest non-integral position defines the lowest position of the headrest at which the switch from integral mode to non-integral mode is allowed. Preferably, the lowest non-integral headrest position of the headrest corresponds to a child aged 3 years. Since the blocking element blocks the compartment against reception of the locking member as long as the headrest is placed at heights lower than the lowest non-integral headrest position it is avoided that the non-integral mode is used too early. A user trying to stow away the locking member of the integral harness system would notice that this is not possible. Therefore, the user will recognize that the child safety seat must be further used in integral mode. A locking member preferably comprises a buckle tongue of the integral harness system.

Advantageously, there will be no or not enough space available in the compartment for the locking members to be stowed away as long as the headrest is placed at heights lower than the lowest non-integral headrest position. It is also possible that the compartment is not accessible from the outside as long as the headrest is placed at heights lower than the lowest non-integral headrest position. Preferably, the compartment comprises a pocket for receiving the locking members.

Preferably, the coupling between the headrest and the blocking element is accomplished by a rigid connection. This ensures that any motion of the headrest is transferred to the blocking element.

Advantageously, the blocking element is further coupled to the headrest such that the blocking element blocks the headrest against placement at heights lower than the lowest non-integral headrest position from the seating portion as long as the locking member is received by the compartment. Preferably, the blocking of the headrest is caused by physical contact between the blocking element and the locking member received by the compartment. By this, it is, again, avoided that the child safety seat is used too early in non-integral mode. The child safety seat is used in non-integral mode when the child is secured in the child safety seat by use of a safety belt of a vehicle. Therefore, as long as the locking members of the integral harness system are stowed away in the compartment, the child safety seat cannot be used in integral mode. The situation in which the locking members are stowed in or received by the compartment typically occurs when a child safety seat upon use for older children in non-integral mode is transformed back to a child safety seat to be used for smaller children in integral mode. In said situation it might happen that a user uses the non-integral mode for children that are not yet amenable to it. Such a situation does, however, not occur in accordance with the invention, since the user is not able to bring the headrest to a lower position than the lowest non-integral headrest position. The user trying to use non-integral mode for smaller children will, thus, recognize that he will have to switch to integral mode in order to adjust the headrest properly.

Advantageously, the blocking element is further configured to reduce the space available in the compartment such that the locking member does not fit into the compartment as long as the headrest is placed at heights lower than the lowest non-integral headrest position. This is a simple way to ensure that the locking members are not stowed away until the headrest has been placed at least at the lowest possible non-integral headrest position. In addition, since there is not enough room for the locking members to be received by the compartment as long as the headrest is placed lower than the non-integral headrest position, it follows that the headrest may not be lowered to a lower than the lowest non-integral headrest position as long as the locking members are stowed in the compartment. The locking members would physically block the blocking element trying to further reduce the space of the compartment. Preferably, the blocking element is coupled to the headrest such that the blocking of the blocking element causes the blocking of the headrest.

Advantageously, the coupling between the blocking element and the headrest is further such that the locking member can be received by the compartment when the headrest is placed at a height higher than the lowest non-integral headrest position. This allows to switch to non-integral mode when the lowest allowed height of the headrest for doing so is reached.

Preferably, the seat shell further comprises a backrest portion, and the compartment is integrated in the backrest portion. A compartment integrated in the backrest portion of the child safety seat has the advantage of easy reachability. A further advantage is that when switching from integral to non-integral mode it is not necessary to remove the entire integral harness system. Preferably, the integral harness system may be stowed beneath a cover of the backrest portion. The locking members are stowed in the compartment.

It is understood, that a child safety seat in accordance of the first aspect of the invention may be combined with any feature of the second aspect of the invention, and vice versa. In fact, it is particularly advantageous if the anti-misuse mechanism of the first aspect and the anti-misuse mechanism of the second aspect are integrated in one single child safety seat. This provides maximal protection against too early switching from integral to non-integral mode and against using the integral mode too long.

Advantageously, the child safety seat is a combination child safety seat configured to be used with the integral harness system or with a safety belt of a vehicle.

Specific embodiments of the invention will now be described by way of example and with reference to the accompanying drawings, in which:

FIG. 2 shows the child safety seat used with a safety belt of a vehicle in non-integral mode, with the headrest positioned at the highest possible position

Figure 5B:
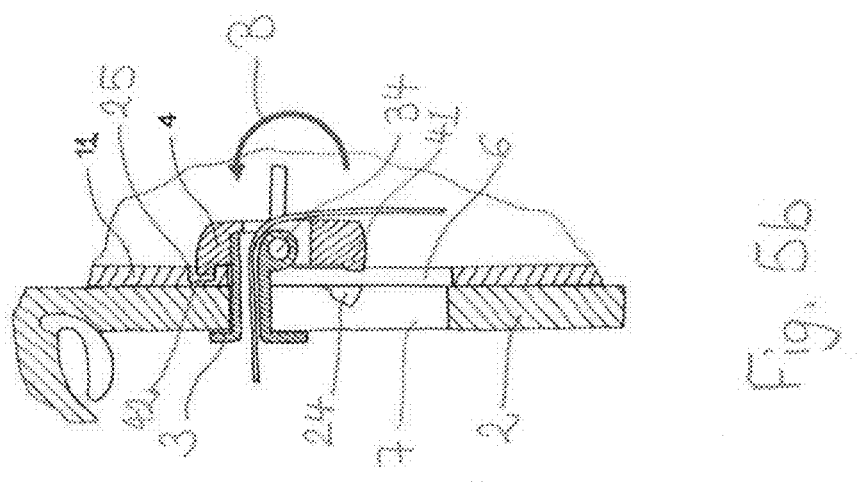
Figure 5A:
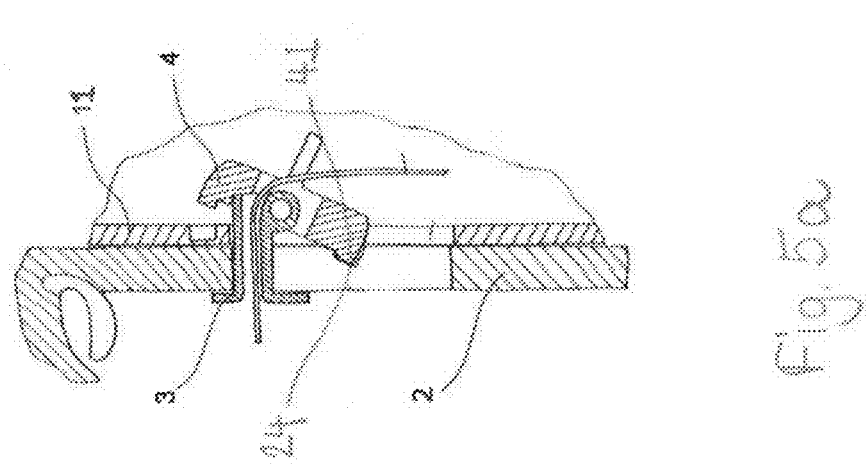
Figure 7:
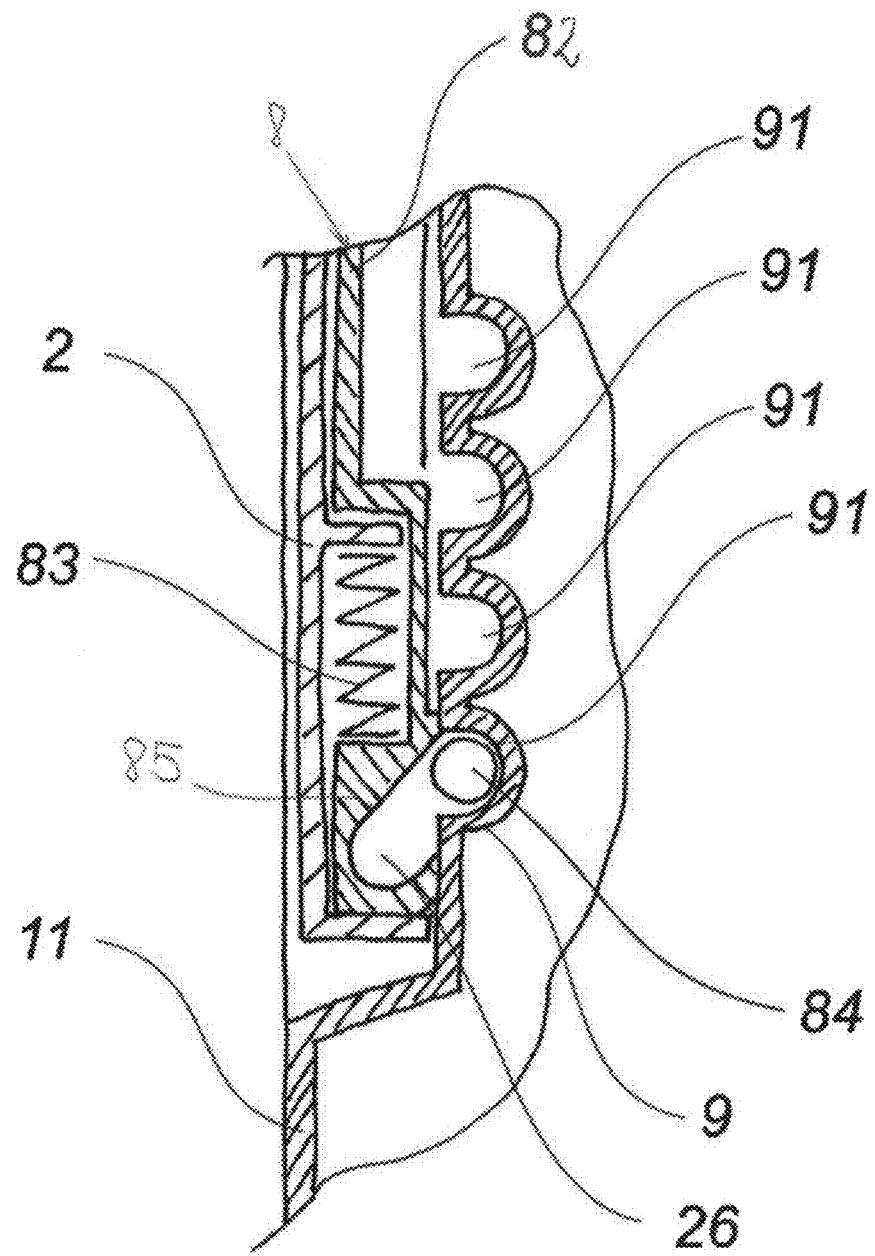
Figure 8A:
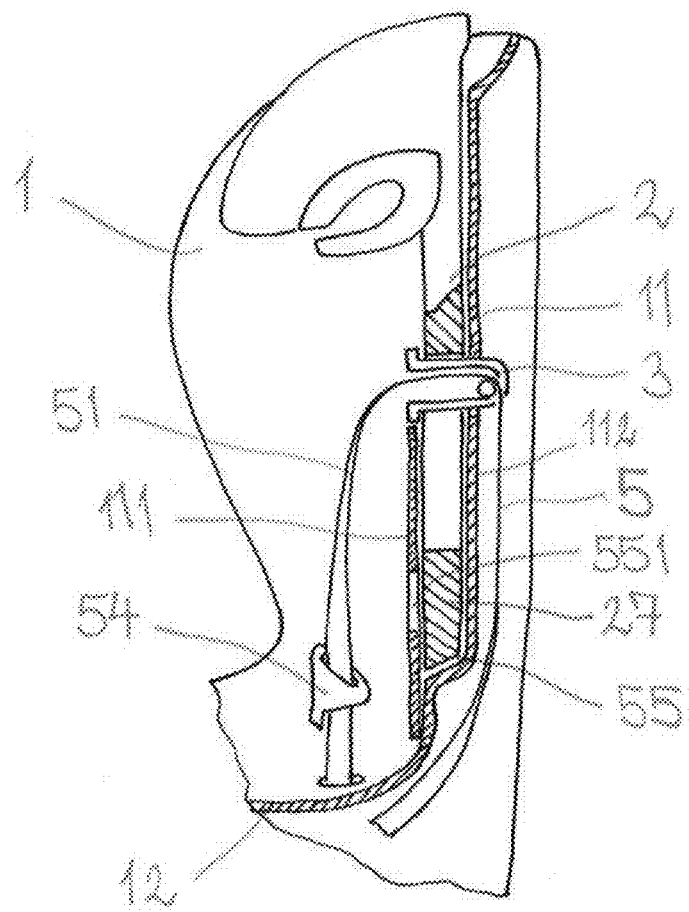
Figure 8B:
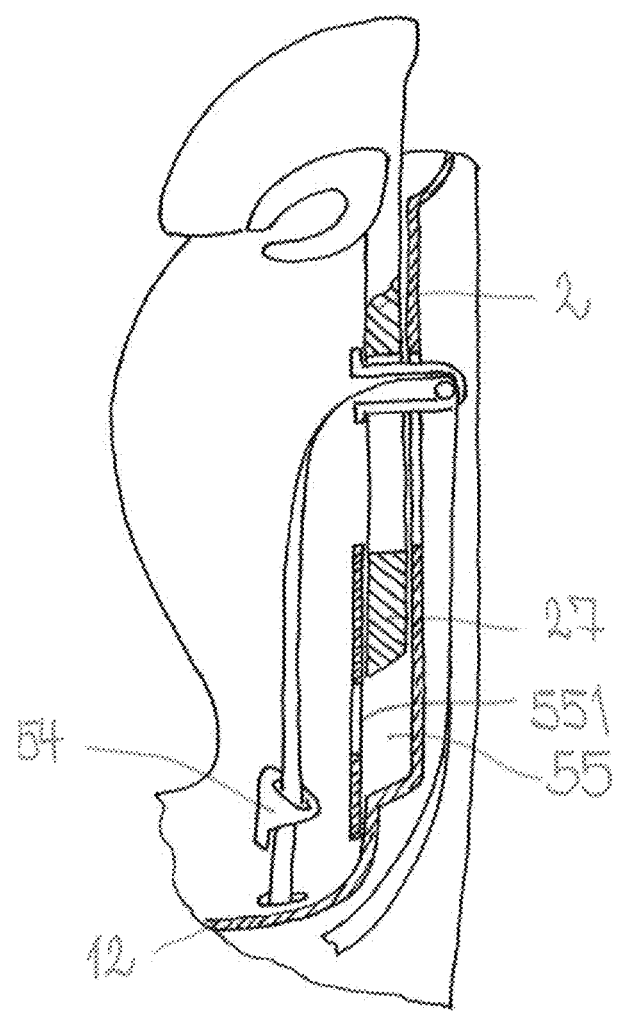
Figure 8C:
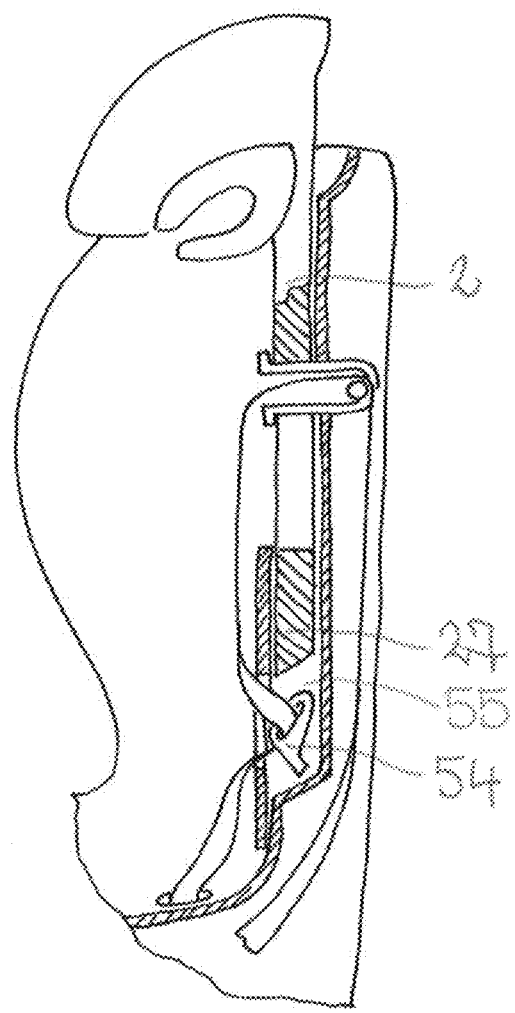

FIGS. 5a and 5b sketch the steps for transmission of the coupling element of the child safety seat with an anti-misuse mechanism preventing using the integral mode too long from the first configuration to the second configuration;

FIG. 6 shows a cross sectional view of the height adjustment mechanism in non-integral mode in accordance with the invention with the headrest in the highest possible position;

FIG. 7 shows a locking mechanism for engaging the headrest with the seat shell;

FIG. 8a shows a cross sectional view of the anti-misuse mechanism for preventing using the non-integral mode too early, with the child safety seat in integral mode;

FIG. 8b shows a cross sectional view of the anti-misuse mechanism for preventing using the non-integral mode too early, for the case that a change from integral to non-integral mode is possible;

FIG. 8c shows a cross sectional view of the anti-misuse mechanism for preventing using the non-integral mode too early, with the child safety seat in non-integral mode.

Figure 1A:
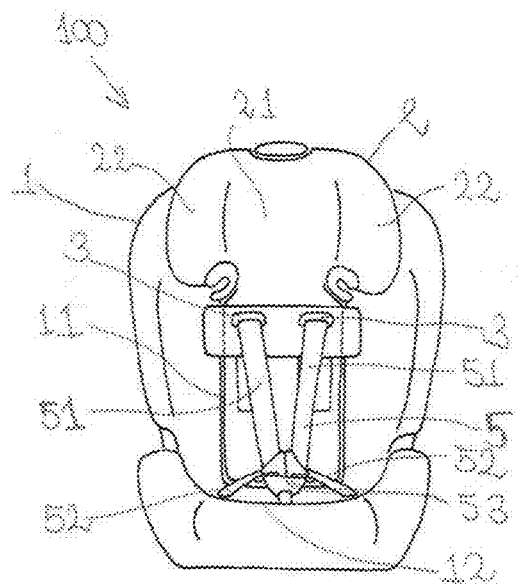
FIG. 1a shows a child safety according to the invention, with integral harness system, with the headrest positioned at the lowest possible position.

In FIG. 1a a child safety seat 100 in accordance with the invention is shown. The child safety seat 100 comprises a seat shell 1 and a headrest 2. The seat shell 1 is for receiving a child. The seat shell 1 is covered by a cover. The cover is padded. The seat shell 1 comprises a backrest portion 11 for receiving, in particular, the back of the child. The seat shell 1 further comprises a seating portion 12 for receiving, in particular, the bottom of the child and parts of his or her legs. The headrest 2 is shown in its lowest position. That is, the distance between the headrest 2 and the seating portion 12 of the seat shell 1 is minimal. This position is suited for small children with an age of about 1 year. The headrest 2 has a central region 21 for receiving the head of the child. Furthermore, the headrest 2 comprises two lateral portions 22. These lateral portions 22 have the form of side wings. They may be padded. The lateral portions 22 surround the child's head and provide protection, in particular, in the case of a side impact. The child safety seat 100 further comprises an integral harness system 5. Of the integral harness system 5 there are shown the shoulder straps 51, the lap straps 52 and the harness buckle 53 with buckle tongues. The integral harness system 5 shown in FIG. 1a is a 5-point harness system. The shoulder straps 51 are guided through a guiding component 3 from the back side (not visible) of the seat shell 1 to the front side of the seat shell 1.

In FIG. 1a the child safety seat is shown in the so-called integral mode, this is, the child safety seat 100 is used with the integral harness system 5. In the integral mode, the guiding component 3 and the headrest 2 are coupled to one another. The coupling is achieved through the adjusting mechanism with coupling element which will be described in detail below. By means of this coupling, the movement of the headrest 2 causes a respective movement of the guiding component 3. For this, the guiding component 3 is slidable along the seat shell 1. Because of this, the guiding component 3 may be designed as a harness slider. Preferably, the harness slider is configured to slide along the backrest portion 11 of the seat shell 1 and to adjust the height of the integral harness 5.

Figure 1B:
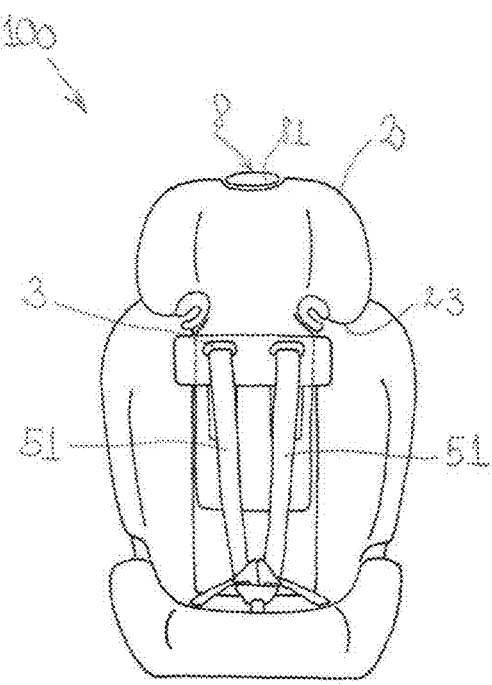
FIG. 1b shows the child safety seat with integral harness system with headrest positioned at the highest possible position in integral mode.

FIG. 1b shows the child safety seat 100 of FIG. 1a still in integral mode. In FIG. 1b the headrest 2 has been moved to the highest position possible in integral mode. In the following, this position will be referred to as "intermediate position", in order to distinguish this position from highest possible position in non-integral mode. The latter being the highest possible position of the headrest which can be achieved within the child safety seat 100.

The adjustment of the height in integral mode can be accomplished by operating an actuator 8. The actuator 8 shown in FIG. 1b comprises a handle 81. The handle 81 is integrated on the top of the headrest 2. As long as the actuator 8 is operated, the headrest may be adjusted at a height between the lowest position and the intermediate position. The details of the height adjustment mechanism will be described below with respect to FIGS. 4 to 7.

When comparing FIG. 1a and FIG. 1b, then the coupling of the headrest 2 and the guiding component 3 in integral mode becomes evident. The distance between the headrest 2 and the guiding component 3 remains constant. This ensures that the shoulder straps 51 of the integral harness are guided substantially horizontally from the guiding component 3 over the shoulders of the occupant of the child safety seat. This is the optimal pathway of the shoulder straps 51 in order to guarantee the most efficient restraint of the child in the case of a frontal collision. The lower edge 23 of the headrest 2 lies slightly above the guiding component's 3 outlets for the shoulder straps 51. For adjusting the height of the headrest 2 it is, therefore, sufficient to bring the lower edge 23 of the headrest 2 into the correct position above the shoulders of the occupant of the child safety seat. Owing to the coupling of the guiding component 3 and the headrest 2 a misuse or a misplacement of the shoulder straps 51 is, therefore, highly reduced.

FIG. 2 shows the child safety seat 100 of FIGS. 1a and 1b in non-integral mode. This means that a safety belt 500 of a vehicle is used to secure a child in the child safety seat 100. The integral harness is not shown any more. According to the invention, it is, however, not necessary to remove the integral harness when the child safety seat 100 is used in non-integral mode. Preferably, the integral harness is, at least partially, covered by the cover of the seat shell or the backrest portion of the seat shell. When comparing FIG. 2 to FIG. 1b it is manifest that the guiding component 3 has not moved, that is, it is fixed at the height it had when the headrest was positioned in the intermediate position. The height of the headrest 2 has increased. This is possible, because, according to the invention, in non-integral mode, the coupling between guiding component 3 and headrest 2 is released. The adjustment of the height of the headrest 2 in non-integral mode can be accomplished by operating the actuator 8. Preferably, the actuator 8 comprises a handle 81 positioned on the top of the headrest 2. The details of the height adjustment mechanism in non-integral mode will be described below with regard to FIGS. 5b and 6.

The height adjustment of the headrest 2 can be performed both in non-integral mode and in integral mode by operating the same actuator 8.

The child safety seat 100 described with regard to FIGS. 1a, 1b and 2 is a so-called combination child safety seat. Such a combination child safety seat may be used for children with an age between approximately 1 year and 12 years. This is possible because of its transformability from a child safety seat with integral harness to a child safety seat which can be used with the safety belt of a vehicle, as described above.

Figure 3:
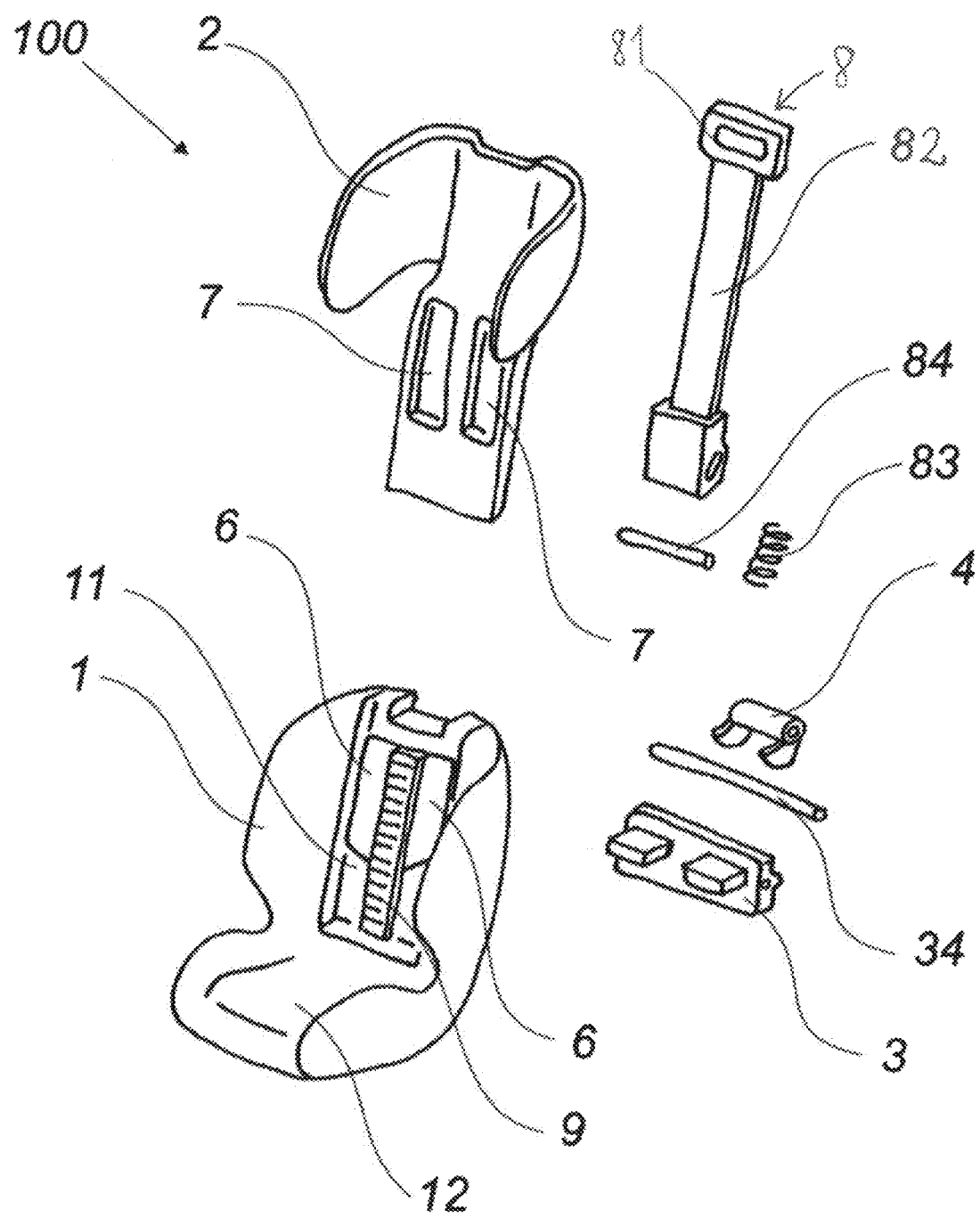
FIG. 3 shows an exploded view of a child safety seat with an anti-misuse mechanism preventing using the integral mode too long in accordance with the invention.

FIG. 3 is an exploded view of the child safety seat 100 of the invention. Shown is the seat shell 1, with cover and padding removed. The seat shell 1 comprises a backrest portion 11 and a seating portion 12. In the backrest portion 11 two openings 6 are visible. Furthermore, a toothed rack 9 is integrated in the seat shell 1. The toothed rack 9 is shown to be attached to the backrest portion 11 of the seat shell 1. The toothed rack 9 of the shown embodiment is integrally formed with the seat shell 1; it may, however, also be formed as a separate part. FIG. 3 further shows a headrest 2 (with cover and padding removed). The headrest 2 comprises two openings 7. The guiding component 3 for guiding the shoulder straps of the integral harness system is also shown. In addition, the coupling element 4 is depicted. A bar 34 connecting the guiding component 3 and the coupling element 4 is also shown. Further, the actuator 8 is shown. The actuator 8 comprises a handle 81, a transmission element 82, and an elastic component 83, such as a spring, and a locking element 84, such as a locking bar. The toothed rack 9 and the actuator 8 are comprised by the invention's locking mechanism. The coupling element 4 and the locking mechanism are part of the height adjustment mechanism of the invention. The locking mechanism will be described in detail below with regard to FIG. 7.

The openings 6 in the backrest portion 11 provide for a guiding rail of the guiding component 3 and the coupling element 4 when the child safety seat is used in integral mode. The purpose and functioning of the backrest openings 6 will become apparent below in the description of FIGS. 4a and 4b.

The openings 7 of the headrest are adapted to receive the guiding component, when the child safety seat 100 is used in the non-integral mode. The openings 7 in the headrest allow the headrest 2 to be adjusted in non-integral mode, even though the guiding component 3 is fixed in the intermediate position. The further purpose and functioning of the headrest openings 7 will become apparent below in the description of FIGS. 5b and 6.

FIGS. 4a, 4b, 5a, 5b, and 6 show in sequence the adjustment of the headrest from the lowest position to the highest position. Specifically, in FIGS. 5a and 5b the transmission of the coupling element 4 from the first configuration to the second configuration is depicted.

Figure 4B:
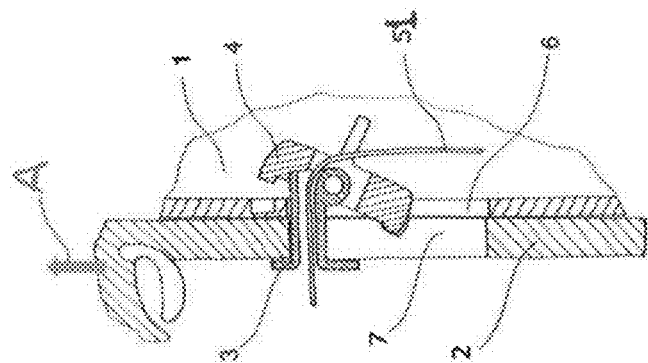
FIG. 4b shows a cross sectional view of the height adjustment mechanism with an anti-misuse mechanism preventing using the integral mode too long in accordance with the invention with the headrest in the intermediate position, i.e., in the highest possible position in integral mode.
Figure 4A:
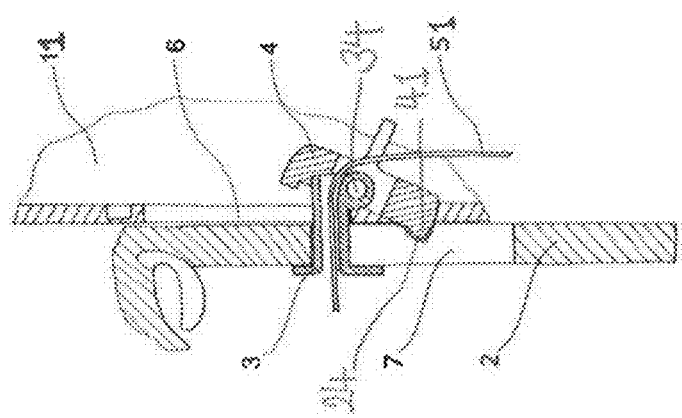
FIG. 4a shows a cross sectional view of the height adjustment mechanism with an anti-misuse mechanism preventing using the integral mode too long in accordance with the invention with the headrest in the lowest possible position.

In FIG. 4a there are shown a headrest 2 with an opening 7, a guiding component 3, and a coupling element 4. The coupling element 4 is part of the height adjustment mechanism. Furthermore, a shoulder strap 51 of the integral harness system is shown. The shoulder strap 51 is guided through the guiding component 3. In addition a part of the backrest portion 11 of the seat shell with a respective opening 6 is visible. The headrest 2 is coupled to the guiding component 3 by the coupling element 4. The headrest 2 comprises a recess 24. The recess 24 is adapted to receive a corresponding engaging member 41 of the coupling element 4. According to the embodiment shown in FIG. 4a the guiding component 3 and the coupling element 4 are connected to one another by means of a bar 34. Other coupling means are possible. The coupling element 4 shown in FIG. 4a is designed as a transmission switch. This transmission switch 4 is pivotably mounted about the bar 34. The seat shell may comprise guiding means, such as rails or a recess (not shown), adapted to receive the ends of the bar 34. If present, said guiding means need, further, be adapted to allow for movement, e.g., sliding, of the bar 34 along the backrest portion 11 of the seat shell. In FIG. 4a the coupling element 4 is placed in the first configuration. In this first configuration, the coupling element 4 connects the headrest 2 with the guiding component 3. The three components coupling element 4, headrest 2 and guiding component 3 form a compound. This compound can be moved along the opening 6 of the backrest portion 11 of the seat shell. In FIG. 4a, the headrest 2 is placed in the lowest possible position.

FIG. 4b shows the change of the position of the headrest 2, the guiding component 3 and the coupling element 4 in relation to FIG. 4a, after adjustment of the height of the headrest 2. The height adjustment during integral mode may be achieved be operating an actuator and pulling the headrest 2 upwards in relation to the seat shell, as indicted by the arrow A. As long as the actuator is operated, the headrest 2 is released from engagement with the seat shell. The details of said operation will be described in more detail below in relation to FIG. 7. The configuration of the coupling element 4 has not changed. The coupling element 4 is still in the first configuration. That means that the headrest 2 and the guiding component 3 are still coupled to one another by the coupling element 4 in the same way as described above in relation to FIG. 4a. In order for the headrest 2 to arrive at the position shown in FIG. 4b, the guiding component 3 and the coupling element 4 are travelling, at least partially, along the openings 6 of the backrest portion 11. The backrest openings 6 serve as guiding rails for stabilizing the components headrest 2, guiding component 3 and coupling element 4 against side movement. In FIG. 4b the guiding component 3 has reached the upper end of the opening 6 of the backrest portion 11. Therefore, it has reached the stop. It is not possible to further increase the height of the headrest 2 as long as the coupling element 4 is in its first configuration. Owing to the coupling of the headrest 2 and the guiding component 3, the distance between the guiding component 3, in particular that of the shoulder strap outlets of the guiding component 3, and the headrest 2 remains constant. The coupling element 4 placed in the first configuration corresponds, thus, to the child safety seat being used in the integral mode. Together with the movement of the guiding component 3, a shoulder strap 51 which is guided through the guiding component 3, is travelling along the backrest portion 11 of the seat shell. This allows to adjust the height of the integral harness system. A locking mechanism which is adapted to engage the headrest 2 to the seat shell, preferably to the backrest portion 11 of the seat, will be described in detail with respect to FIG. 7.

FIGS. 5a and 5b show the transmission of the coupling element 4 from the first configuration to the second configuration when the headrest 2 has reached the intermediate position, that is, the highest possible position in integral mode.

In FIG. 5a, the coupling element 4 of the child safety seat is in the first configuration. The configuration of the child safety seat shown in FIG. 5a corresponds to that depicted in FIG. 4b. The coupling element 4, thus, couples the guiding element 3 and the headrest 2. The coupling might be achieved by an end portion 41 of the coupling element 4 being received by a recess 24 of the headrest 2, as described above in relation to FIG. 4a.

FIG. 5b shows the child safety seat with the coupling element 4 of the adjustment mechanism placed in the second configuration. The headrest 2 is still positioned in the intermediate position, that is, at the same height as shown in FIG. 5a. The guiding component 3 is shown to abut against the upper end of the opening 7 of the headrest. The guiding component 3 abuts against the upper end of the opening 6 of the backrest portion 11 of the seat shell. Compared to FIG. 5a, in FIG. 5b the coupling component 4 has been pivoted or rotated about the bar 34. The pivoting/rotation is indicated by arrow B. The coupling element 4 is not received by the recess 24 of the headrest 2 anymore. The coupling element 4 remains, however, engaged with the guiding component 3. In the embodiment shown in FIG. 5b, the latter engagement is achieved through the bar 34. When in the second configuration, as shown in FIG. 5b, the coupling element 4 of the adjustment mechanism does not couple the guiding component 3 to the headrest 2 any longer. That is, the headrest 2 is free to move without connection to the guiding component 3. Furthermore, as manifest in FIG. 5b, a respective engaging member 42 of the coupling element 4 is received in recess 25 of the backrest portion 11 of the seat shell. By this, the coupling element 4 couples the guiding component 4 with the backrest portion 11 of the seat shell. The guiding component 4 is, therefore, prevented from further movement. In other words, the height of the headrest 2 may be adjusted while the guiding component 4 stays fixed. The guiding component 3 cannot be placed at a higher position from the seating portion of the seat shell than the intermediate position. This prevents a user from using the child safety seat with the integral harness system, i.e., in integral mode, for children which have already grown out of integral mode seats.

In a preferred embodiment, the transmission of the coupling element 4 between the first configuration, as shown, e.g., in FIG. 5a, and the second configuration, as shown, e.g., in FIG. 5b, is only possible if the headrest 2 is positioned in the intermediate position. This may be achieved by properly choosing the dimensions of the recess 24 of the headrest 2, the recess 25 of the backrest portion 11, and those of the corresponding engaging members 41 and 42 of the guiding component 4. In FIG. 5b the headrest 2 is in the intermediate position. In this case, when a user pivots/rotates the guiding component 4 about the bar 34, the recess 25 in the backrest portion 11 is positioned such that it is able to receive the corresponding engaging member 42 of the coupling element 4. Assuming that the headrest 2 were at a height lower than the intermediate position, then, when a user tried to pivot/rotate the guiding component 4 about the bar 34, the engaging member 42 of the guiding component 4 would abut against a part of the backrest portion 11 preventing the engaging member 41 of the guiding component 4 from fully disengaging from the recess 24 of the headrest 2. Therefore, the coupling between the headrest 2 and the guiding component 3 remains intact unless the headrest 2 has reached the intermediate position. An analogous consideration holds true for the transmission from the second configuration of the coupling element 4 to the first configuration.

FIG. 6 shows the change of the position of the headrest 2, the guiding component 3 and the coupling element 4 in relation to FIG. 5b, after adjustment of the height of the headrest 2. The height adjustment when the coupling element 4 is in the second configuration, such as in non-integral mode, may be achieved in the same way as when the coupling element 4 is in the first configuration, e.g., in integral mode. That is, height adjustment may be done by operating the same actuator as in integral mode and pulling the headrest 2 upwards in relation to the seat shell, as indicated by the arrow C. As long as the actuator is operated, the headrest 2 is released from engagement with the seat shell. The details of said operation will be described in more detail below in relation to FIG. 7. The configuration of the coupling element 4 has not changed with regard to that of FIG. 5b. This means that, as described in detail above with regard to FIG. 5b, the coupling element 4 couples the guiding component 3 with the backrest portion 11 of the seat shell; the headrest 2 is not connected to the guiding component 3 anymore. In order for the headrest 2 to arrive at the position shown in FIG. 6, the headrest 2 is travelling, at least partially, along the backrest portion 11 of the seat shell. The headrest 2 comprises one or more openings 7. The headrest openings 7 ensure that the guiding component 3 does not prevent the headrest 2 from movement in the non-integral mode. In other words, when seen from the headrest's 2 frame of reference, the guiding component 3 travels along the headrest openings 7 from the upper stop of the headrest openings 7 towards the lower stop of the headrest openings 7 when the height of the headrest 2 is increased, as indicted by arrow C, in non-integral mode. With respect to the backrest portion 11 of the seat shell, the guiding component 4 remains at a fixed position, preferably the intermediate position, while the headrest 2 moves upwards with respect to the backrest portion 11, thereby increasing the height of the headrest 2. The headrest openings 7 cooperating with the guiding component 4 as described previously contribute, in addition, to a stabilization of the headrest 2 against lateral movement.

In FIG. 6 the headrest 2 has reached the highest possible position, i.e., the highest position. The lower end of the opening 7 of the headrest 2 abuts against the guiding component 3. Therefore, it has reached the stop. It is not possible to further increase the height of the headrest 2. Since the coupling element 4 does not couple the guiding component 3 with the headrest 2, upon height adjustment of the headrest 2, a shoulder strap 51 which is guided through the guiding component 3, remains at a fixed position of the backrest portion 11 of the seat shell. The integral harness system does not need to be removed from the child safety seat. The height adjustment of the headrest 2 may be performed in non-integral mode despite the installed integral harness system. For comfort's reasons, it is possible to stow the shoulder straps 51 of the integral harness behind the cover of the child safety seat. It is, however, also possible to remove the integral harness system from the child safety seat, for the purpose of e. g. cleaning, maintenance, exchange etc. A locking mechanism which is adapted to engage the headrest 2 to the seat shell, preferably to the backrest portion 11 of the seat, will be described in detail with respect to FIG. 7.

FIG. 7 shows a locking mechanism which may be used for bringing the headrest 2 into engagement with the seat shell, preferably with the backrest portion 11 of the seat shell, at different heights. In FIG. 7 a configuration is shown in which the headrest 2 is in engagement with the backrest portion 11 of the seat shell. That is, the headrest 2 is fixed at a certain height to the seat shell. The locking mechanism is part of the height adjustment mechanism of the child safety seat. The locking mechanism comprises a toothed rack 9 and an actuator 8. The actuator 8 comprises a handle (not shown in FIG. 7, but shown with reference numeral 81 in FIG. 3), a transmission element 82, and an elastic component 83, such as a spring, and a locking element 84, such as a locking bar. The actuator 8 is coupled to the headrest 2 of the child safety seat. The toothed rack 9 is integrated into the seat shell, preferably, into the backrest portion 11 of the seat shell. The toothed rack 9 comprises notches 91 configured to receive the locking bar 84. The notches are spaced apart in such a manner that the headrest 2 is adjustable at a given number of different heights. By means of the toothed rack 9, a gradual height adjustment of the headrest 2 is possible. The toothed rack 9 may be integrally formed with the seat shell. It is, however, also possible that the toothed rack 9 is separately formed and afterwards integrated into the seat shell.

The locking mechanism is locked by locking the locking bar 84 between the transmission element 82 and the toothed rack 9. In this way, the locking bar 84 cannot be removed from the notch 91 of the toothed rack 9 it is placed in. The transmission element 82 transfers the movement of the handle into movement of the locking bar 84. The locking bar 84 is slidably mounted in one or more recesses 26 of the headrest 2. This may be achieved, e.g., by the end portions of the locking bar 84 being received in corresponding recesses 26. By this, the locking bar 84 is connected to the headrest 2. Upon operation, e.g., by pulling, of the handle, the transmission element 82 is moved in the same direction. The movement of the transmission element 82 is against the force of the elastic component 83. When the handle is pulled upwards, the transmission element 82 first compresses the elastic element 83. Once a certain threshold or a stop is reached, the elastic element 83 does not compress any longer. In this position of the transmission element 82 the receiving portion 85 of the transmission element 82 is aligned with the notch 91 of the toothed rack 9 the locking bar 84 is placed in, so that the locking bar 84 is free to move into the receiving portion 85.

If the handle is, then, further pulled, the headrest 2 to which the actuator 8 is coupled, is pulled upwards. By pulling upwards the headrest 2, the recesses 26 for the locking bar 84 integrated in the headrest 2 are also moved upwards. This causes the locking bar 84 to move out of a notch 91 of the toothed rack 9 into the receiving portion 85. The movement of the locking bar 84 in relation to the headrest 2 is restricted by the recesses 26. Once the locking bar 84 has moved out of a notch 91 of the toothed rack 9, the headrest 2 is released from engagement with the seat shell. The height of the headrest 2 is then adjustable. The headrest 2 may be moved up or down the backrest portion 11 of the seat shell. Once the appropriate height has been found the user stops operating the actuator 8. Then, the elastic element 83 drives the transmission element 82 back to its rest position. On its way back to the rest position, the transmission element 82 drives the locking bar 84 into engagement with the toothed rack 9. The locking bar 84 may be driven by the transmission element 82 along the recesses 26 into one of the notches 91 of the toothed rack 9. The headrest 2 is, then, fixed at certain height with respect to the seat shell, in particular, with respect to the backrest portion 11 or the seating portion of the seat shell.

According to the child safety seat of the invention, one actuator 8 is sufficient for adjusting the height of the headrest 2 both in integral mode and in non-integral mode. This implies that the same locking mechanism is suitable for both modes. The locking mechanism described with respect to FIG. 7 may be used when the coupling element of the adjustment mechanism is in the first configuration, as well as when the coupling element is in the second configuration. This means that the toothed rack 9 is preferably chosen such that it allows for height adjustment of the headrest 2 from the lowest position, i.e., the lowest possible position, i.e., the lowest possible position in integral mode, up to the highest position, i.e., the highest possible position, i.e., the highest possible position in non-integral mode.

The anti-misuse mechanism of the embodiments described before prevent the usage of the integral mode too long. They do, however, not necessarily prevent a user of the child safety seat from using the non-integral mode too early. As described above, it is one advantage of the invention that the integral harness system does not necessarily need to be removed when switching from integral to non-integral mode. Therefore, the user is not prevented from changing to non-integral mode even if the headrest has not yet reached the intermediate position.

The embodiments described in the following with respect to FIGS. 8a, 8b, and 8c provide an anti-misuse mechanism against too early usage of the non-integral mode. The anti-misuse mechanism for preventing the non-integral mode too early may be used in addition to the anti-misuse mechanism for preventing usage of the integral mode too long in the same child safety seat. When both anti-misuse mechanisms are jointly used in the same embodiment of a child safety seat, enhanced/optimal anti-misuse protection is provided.

FIG. 8a shows a child safety seat with an anti-misuse mechanism preventing too early usage of the non-integral mode. In FIG. 8a there is shown a seat shell 1 of the child safety seat, comprising a backrest portion 11 and a seating portion 12, a headrest 2, and a guiding component 3 for guiding the shoulder straps 51 of the integral harness system 5. The guiding component 3 is preferably a harness slider. In addition to the shoulder straps 51, a locking member 54 of the integral harness system 5 is shown. Preferably, the locking member 54 is a buckle tongue adapted to be secured in a harness buckle (not shown) of the integral harness system 5. Moreover, it is shown that a blocking element 27 is coupled to the headrest 2. The backrest portion 11 of the child safety seat comprises a front part 111 and a rear part 112. The front part 111 is the part of the backrest portion 12 adapted to receive the back of a child which is placed in the child safety seat. The rear part 112 of the backrest portion 12 is the part turned away from the child. The front part 111 of the backrest portion 12 comprises an opening 551. The opening 551 is dimensioned such that the locking member 54 fits through it. Between the front part 111 and the rear part 112 of the backrest portion 12 there is located a compartment 55. The dimensions of the compartment 55 are such that it is adapted to receive the locking member 54, or, if more than one locking member 54 is employed, to receive all of the locking members 54. The compartment 54 may comprise one or more pockets. The shown child safety seat is used in integral mode. That is, the integral harness system 5 is used to secure a child placed in the child safety seat. In this case the blocking element 27 blocks the compartment against reception of the locking member 54. As shown in FIG. 8a, the blocking element 27 blocks the opening 551 of the front part 111 of the backrest portion 12. It is not possible to bring the locking member 54 through the opening 551 into the compartment 55. The blocking element 27 not only blocks the opening 551, and, thus the entrance to the compartment 55. The shown blocking element 27 is also dimensioned such that it reduces the space available in the compartment 55 so that the locking member 54 would not fit into it. The blocking element 27 is coupled to the headrest 2. The blocking element 27 may be integrally formed with the headrest 2. It is, however, also possible that the blocking element 27 is a separate part which is coupled, e.g., attached, to the headrest.

In addition, it is advantageous that the child safety seat shown in FIG. 8a comprises an adjustment mechanism comprising a coupling element (not shown) configured to be placed in a first and a second configuration for coupling the guiding component 3 with the headrest 2 or the seat shell 1, respectively, as described in detail above, in particular, with respect to FIGS. 3 to 6. In this case, the child safety seat comprises, in addition to the anti-misuse mechanism preventing too early usage of the non-integral mode, an anti-misuse mechanism preventing too long usage of the integral mode.

In the shown integral mode, it is not possible for a user to stow away the locking member 54 in the compartment 55. Therefore, by choosing the dimensions of the compartment 55 and the blocking element 27 so that it is possible to stow the locking member 54 in the compartment 55 only once the headrest 2 has reached a lowest non-integral headrest position, it is avoided that the non-integral mode is used too early.

FIG. 8b shows the child safety seat of FIG. 8a with the headrest 2 raised to a higher position with respect to the seating portion 12. The headrest 2 is placed at the lowest non-integral headrest position. This position is defined as the minimal possible height of the headrest 2 (with respect to the seating portion 12) for which it is possible to store the locking member 54 in the compartment 55. In the shown embodiment the blocking element 27 is coupled such to the headrest 2 that the raising of the headrest 2 above the lowest non-integral headrest position causes the blocking element 27 to release the compartment 55 from being blocked. For this, the blocking element 27 may be rigidly connected to the headrest 2. The blocking element 27 may be integrally formed with the headrest 2. In the shown embodiment, the lower edge of the blocking element 27 is at the same height as the upper edge of the opening 551. Assuming that the opening 551 is dimensioned such that the locking member 54 fits through it, then the lowest non-integral headrest position of the shown embodiment is reached when the blocking element 27 fully clears/unblocks the opening 551. Only starting from heights of the headrest being equal to or exceeding the lowest non-integral headrest position is it possible for a user to store/stow away the locking member 54 or locking members 54 in the compartment 55. As long as the headrest 2 is placed at heights lower than the lowest non-integral headrest position, the blocking element 27 blocks the compartment 55. As long as this is the case, the storage of the locking members 54 in the compartment 55 is not possible.

In FIG. 8*b*, the locking member 54 is not yet stored in the compartment 55. The child safety seat is, thus, in integral mode. It is, however, possible to store the locking member 54 in the compartment 55, since the opening 551 is clear/unblocked. In other words, the child safety seat could be switched from integral mode to non-integral mode. This may be accomplished by storing the locking member 54 in the compartment 55.

FIG. 8*c* shows the child safety seat of FIG. 8*b*, that is, with the headrest 2 placed at the lowest non-integral headrest position. In FIG. 8*c*, the locking member 54 is stored in the compartment 55. The transmission from the integral mode of the child safety seat to the non-integral mode has been performed. In the non-integral mode, the child needs to be secured in the child safety seat by means of the safety belt of the vehicle. When further raising the headrest 2, the blocking element 27 raises, too. On the other hand, when lowering the headrest 2 in non-integral mode with the locking member 54 stored in the compartment 55, the following situation might occur. When the blocking element 27 is rigidly connected to the headrest 2 then the blocking element 27 will be lowered upon lowering of the headrest 2. If a user tries to lower the headrest 2 beneath the lowest non-integral headrest position, the blocking element 27 will, thus, get in contact with the locking member 54. The locking member 54, thus, physically blocks the blocking element 27 against upward movement. The blocking of the blocking element 27 causes the blocking of the headrest 2. Because of this, as long as the locking member 54 is stored in the compartment 55, it is not possible for the headrest 2 to be lowered to heights substantially lower than the lowest non-integral headrest position. This prevents a user from switching back from non-integral mode to integral mode for children which are too small.

As described above, it is advantageous that the child safety seat shown in FIGS. 8*a*, 8*b*, and 8*c* comprises an adjustment mechanism comprising a coupling element configured to be placed in a first and a second configuration for coupling the guiding component 3 with the headrest 2 or the seat shell 1, respectively, as described, in particular, with respect to FIGS. 3 to 6. In this case, the lowest non-integral headrest position is at a position less distant from the seating portion 12 than the intermediate position at which the change from the first configuration of the coupling element to the second configuration is possible. The intermediate position defines the highest possible position of the headrest 2 in integral mode. The lowest non-integral headrest position defines the lowest possible position of the headrest 2 in non-integral mode. Preferably, the intermediate position corresponds to children aged 4 years. Preferably, the lowest non-integral headrest position corresponds to children aged 3 years. Between the lowest non-integral headrest position and the intermediate position the child safety seat may be used both in integral and non-integral mode.

LIST OF REFERENCE NUMERALS

1 seat shell
11 backrest portion of the seat shell 1
111 front part of the backrest portion 11
112 rear part of the backrest portion 11
12 seating portion of the seat shell 1
100 child safety seat
2 headrest
21 central region of the headrest 2
22 lateral portion of the headrest 2
23 lower edge of the headrest 2
24 recess of the headrest 2
25 recess of the backrest portion 11
26 recess(es) of the headrest 2 for receiving the locking element/locking bar 84 of the actuator 8
27 blocking element
3 guiding component
34 bar connecting guiding component 3 and coupling element 4
4 coupling element
41 engaging member of the coupling element 4 corresponding to the recess 24 of the headrest 2
42 engaging member of the coupling element 4 corresponding to the recess 25 of the backrest portion 11
5 integral harness system
51 shoulder straps of the integral harness system 5
52 lap straps of the integral harness system 5
53 harness buckle of the integral harness system 5
54 locking member/buckle tongues of the integral harness system 5
55 compartment for the locking member 54
551 opening of the compartment 55
500 safety belt of a vehicle
6 opening(s) of the backrest portion 11/backrest opening(s)
7 opening(s) of the headrest 2/headrest opening(s)
8 actuator
81 handle of the actuator 8
82 transmission element of the actuator 8
83 elastic component of the actuator 8
84 locking element/locking bar of the actuator 8
85 receiving portion for locking bar 84
9 toothed rack
91 notch(es) of the toothed rack 9
A arrow indicating movement of the headrest 2 in integral mode
B arrow indicating the pivoting/rotation direction of the coupling element 4
C arrow indicating movement of the headrest 2 in non-integral mode

The invention claimed is:

1. Child safety seat comprising
a seat shell,
a headrest,
a guiding component slidably coupled to the seat shell, the guiding component being configured to guide a strap of an integral harness system of the child safety seat, and
an adjustment mechanism configured to adjust the height of the headrest, the adjustment mechanism comprising a coupling element which is configured to be placed in a first configuration and a second configuration, wherein, when placed in the first configuration, the coupling element couples the headrest with the guiding component to allow for movement of the headrest together with the guiding component relative to the seat shell, wherein, when placed in the second configuration, the coupling element couples the seat shell with the guiding component to prevent the guiding component from movement relative to the seat shell and to allow for movement of the headrest relative to the seat shell, wherein the seat shell comprises a seating portion, wherein the adjustment mechanism further comprises a locking mechanism adapted to engage the headrest with the seat shell at different heights from the seating portion, wherein the child safety seat is configured such that the headrest is allowed to engage with the seat shell at heights ranging from a lowest position to an intermediate position to a highest position, the intermediate position being further distant from the seating portion than the lowest position when the coupling element is in the first configuration, and the highest position being further distant from the seating portion than the intermediate position when the coupling element is in the second configuration, and wherein the locking mechanism further comprises a toothed rack attached to the seat shell and a locking element, wherein the locking mechanism is configured such that the locking element is received by the toothed rack when the headrest is engaged with the seat shell.

2. The child safety seat according to claim 1, wherein the coupling element is configured such that a change from the first to the second configuration is possible only if the headrest is in the intermediate position.

3. The child safety seat according to claim 1, wherein, when placed in the first configuration, the coupling element further couples the headrest with the guiding component such that the distance between the headrest and the guiding component remains constant upon movement of the headrest or the guiding component.

4. The child safety seat according to claim 1, wherein the locking mechanism further comprises an actuator operable to move the headrest from the lowest position to the intermediate position, when the coupling element is in the first configuration, and from the intermediate position to the highest position, when the coupling element is in the second configuration.

5. The child safety seat according to claim 1, wherein the seat shell further comprises a backrest portion, wherein the guiding component is slidable along the backrest portion, when the coupling element is placed in the first configuration.

6. The child safety seat according to claim 5, wherein the backrest portion of the seat shell comprises a backrest opening, wherein the guiding component and the coupling element are slidably mounted in the backrest opening, when the coupling element is placed in the first configuration.

7. The child safety seat according to claim 1, wherein the headrest has a headrest opening adapted to receive the guiding component, when the coupling element is in the second configuration, and wherein the headrest opening of the headrest is dimensioned so as to allow the headrest to move from the intermediate position to the highest position.

8. Child safety seat comprising;

a seat shell, a headrest, a guiding component slidably coupled to the seat shell, the guiding component being configured to guide a strap of an integral harness system of the child safety seat, and an adjustment mechanism configured to adjust the height of the headrest, the adjustment mechanism comprising a coupling element which is configured to be placed in a first configuration and a second configuration, wherein, when placed in the first configuration, the coupling element couples the headrest with the guiding component to allow for movement of the headrest together with the guiding component relative to the seat shell, wherein, when placed in the second configuration, the coupling element couples the seat shell with the guiding component to prevent the guiding component from movement relative to the seat shell and to allow for movement of the headrest relative to the seat shell, wherein the seat shell comprises a seating portion, wherein the adjustment mechanism further comprises a locking mechanism adapted to engage the headrest with the seat shell at different heights from the seating portion, wherein the child safety seat is configured such that the headrest is allowed to engage with the seat shell at heights ranging from a lowest position to an intermediate position to a highest position, the intermediate position being further distant from the seating portion than the lowest position when the coupling element is in the first configuration, and the highest position being further distant from the seating portion than the intermediate position when the coupling element is in the second configuration, wherein the child safety seat further comprises a compartment adapted to receive a locking member of the integral harness system and a blocking element, and wherein the blocking element is coupled to the headrest such that the blocking element blocks the compartment against reception of the locking member as long as the headrest is placed at heights lower than a lowest non-integral headrest position from the seating portion.

9. The child safety seat according to claim 8, wherein the locking mechanism further comprises a toothed rack attached to the seat shell and a locking element, wherein the locking mechanism is configured such that the locking element is received by the toothed rack when the headrest is engaged with the seat shell.

10. The child safety seat according to claim 8, wherein the coupling element is configured such that a change from the first to the second configuration is possible only if the headrest is in the intermediate position.

11. The child safety seat according to claim 8, wherein, when placed in the first configuration, the coupling element further couples the headrest with the guiding component such that the distance between the headrest and the guiding component remains constant upon movement of the headrest or the guiding component.

12. The child safety seat according to claim 8, wherein the locking mechanism further comprises an actuator operable to move the headrest from the lowest position to the intermediate position, when the coupling element is in the first configuration, and from the intermediate position to the highest position, when the coupling element is in the second configuration.

13. The child safety seat according to claim 8, wherein the seat shell further comprises a backrest portion, wherein the guiding component is slidable along the backrest portion, when the coupling element is placed in the first configuration.

14. The child safety seat according to claim 13, wherein the backrest portion of the seat shell comprises a backrest opening, wherein the guiding component and the coupling element are slidably mounted in the backrest opening, when the coupling element is placed in the first configuration.

15. Child safety seat comprising
a seat shell with a seating portion,
a headrest,
an integral harness system comprising a locking member,
an adjustment mechanism for adjusting the height of the headrest,
a compartment adapted to receive the locking member, and
a blocking element,
wherein the blocking element is coupled to the headrest such that the blocking element blocks the compartment against reception of the locking member as long as the headrest is placed at heights lower than a lowest non-integral headrest position from the seating portion.

16. The child safety seat according to claim 15, wherein the blocking element is further coupled to the headrest such that the blocking element blocks the headrest against placement at heights lower than the lowest non-integral headrest position from the seating portion as long as the locking member is received by the compartment.

17. The child safety seat according to claim 15, wherein the blocking element is further configured to reduce the space available in the compartment such that the locking member does not fit into the compartment as long as the headrest is placed at heights lower than the lowest non-integral headrest position.

18. The child safety seat according to claim 15, wherein the coupling between the blocking element and the headrest is further configured such that the locking member can be received by the compartment when the headrest is placed at a height higher than the lowest non-integral headrest position.

19. The child safety seat according to claim 15, wherein the seat shell further comprises a backrest portion, and wherein the compartment is integrated in the backrest portion.

* * * * *